US011192820B2

(12) United States Patent
Hughes et al.

(10) Patent No.: US 11,192,820 B2
(45) Date of Patent: Dec. 7, 2021

(54) COATED GLASS PANE (71) Applicant: PILKINGTON GROUP LIMITED, Lathom (GB)

(72) Inventors: Monica Joscelyn Hughes, St. Helens (GB); Charlie James Patrickson, Lathom (GB); Kieran James Cheetham, Netherton (GB); John Andrew Ridealgh, Lathom (GB); Rory Back, Liverpool (GB)

(73) Assignee: Pilkington Group Limited, Lathom (GB)

( * ) Notice: Subject to any disclaimer, the term of this patent is extended or adjusted under 35 U.S.C. 154(b) by 0 days.

(21) Appl. No.: 17/042,354

(22) PCT Filed: Mar. 26, 2019

(86) PCT No.: PCT/GB2019/050848
§ 371 (c)(1),
(2) Date: Sep. 28, 2020

(87) PCT Pub. No.: WO2019/186131
PCT Pub. Date: Oct. 3, 2019

(65) Prior Publication Data
US 2021/0017069 A1    Jan. 21, 2021

(30) Foreign Application Priority Data

Mar. 28, 2018 (GB) ..................... 1805065

(51) Int. Cl.
*B32B 15/04* (2006.01)
*C03C 17/245* (2006.01)
(Continued)

(52) U.S. Cl.
CPC ...... *C03C 17/2453* (2013.01); *B32B 17/1022* (2013.01); *B32B 17/10174* (2013.01);
(Continued)

(58) Field of Classification Search
CPC .......................... C03C 17/366; C03C 17/3613
(Continued)

(56) References Cited

U.S. PATENT DOCUMENTS 5,591,529 A * 1/1997 Braatz .................... G02B 5/208
                                                        359/359
6,541,133 B1   4/2003 Schicht et al.
(Continued)

FOREIGN PATENT DOCUMENTS

WO   WO2008/010883 A1   1/2008
WO   WO2017/010958 A1   1/2017

OTHER PUBLICATIONS

Bong Seob Yang et al., Role of ZrO2 incorporating in the suppression of negative bias illumination-induced instability in Zn—Sn—O thin film transistors, 2011 American Institute of Physics, Mar. 25, 2011, 3 pages, Applied Physics Letters 98, 122110 (2011).
(Continued)

*Primary Examiner* — Lauren R Colgan
(74) *Attorney, Agent, or Firm* — Marshall & Melhorn, LLC (57) ABSTRACT

A coated glass pane and a method of preparing same comprising at least the following layers in sequence:
a glass substrate;
a lower anti-reflection layer,
a silver-based functional layer;
a barrier layer;
an upper dielectric layer; and
a topmost dielectric layer which comprises an oxide of zinc (Zn), tin (Sn) and zirconium (Zr); and wherein the amount of zirconium in the topmost dielectric layer comprises at least 10 atomic percent zirconium.

22 Claims, 1 Drawing Sheet

(51) Int. Cl.
*C03C 17/36* (2006.01)
*B32B 17/10* (2006.01)

(52) U.S. Cl.
CPC ...... *B32B 17/10431* (2013.01); *C03C 17/366* (2013.01); *C03C 17/3613* (2013.01); *C03C 17/3626* (2013.01); *C03C 17/3644* (2013.01); *C03C 2217/216* (2013.01); *C03C 2217/22* (2013.01); *C03C 2217/78* (2013.01); *C03C 2218/154* (2013.01)

(58) Field of Classification Search
USPC .......................................... 428/426, 432, 434
See application file for complete search history.

(56) References Cited

U.S. PATENT DOCUMENTS

| | | | |
|---|---|---|---|
| 6,783,876 B2 | 8/2004 | Schicht et al. | |
| 6,797,389 B1* | 9/2004 | Depauw | B32B 17/10036 |
| | | | 427/163.1 |
| 7,150,916 B2 | 12/2006 | Lemmer et al. | |
| 7,217,460 B2 | 5/2007 | Nunez-Regueiro et al. | |
| 7,521,096 B2 | 4/2009 | Lemmer et al. | |
| 7,645,487 B2* | 1/2010 | Petrmichl | C23C 14/5806 |
| | | | 427/372.2 |
| 8,043,707 B2* | 10/2011 | Schicht | C03C 17/3652 |
| | | | 428/432 |
| 8,153,266 B2 | 4/2012 | Petrmichl et al. | |
| 8,318,312 B2 | 11/2012 | Petrmichl et al. | |
| 8,497,014 B2* | 7/2013 | Unquera | C03C 17/36 |
| | | | 428/215 |
| 8,883,277 B2 | 11/2014 | Janssen et al. | |
| 9,045,363 B2* | 6/2015 | Hassan | C23C 14/185 |
| 9,315,414 B2 | 4/2016 | Hassan et al. | |
| 9,919,497 B2 | 3/2018 | Reutler et al. | |
| 2003/0012963 A1* | 1/2003 | Ebisawa | C03C 17/3626 |
| | | | 428/432 |
| 2005/0202255 A1 | 9/2005 | Lemmer et al. | |
| 2006/0207291 A1 | 9/2006 | Lemmer et al. | |
| 2006/0240266 A1* | 10/2006 | Schicht | C03C 17/3634 |
| | | | 428/426 |
| 2009/0169846 A1* | 7/2009 | Siddle | C03C 17/3652 |
| | | | 428/216 |
| 2009/0197077 A1 | 8/2009 | Reutler et al. | |
| 2013/0344321 A1* | 12/2013 | McSporran | C03C 17/36 |
| | | | 428/336 |
| 2014/0087160 A1* | 3/2014 | McSporran | C03C 17/002 |
| | | | 428/216 |
| 2018/0141314 A1 | 5/2018 | Reutler et al. | |

OTHER PUBLICATIONS

UK Intellectual Property Office, GB Search Report, dated Sep. 4, 2018, issued in GB 1805065.8, 1 page, UK Intellectual Property Office, Newport, South Wales.

European Patent Office, International Search Report with Written Opinion, issued in PCT/GB2019/050848, dated Jun. 26, 2019, 9 pages, European Patent Office, Rijswijk, Netherlands.

* cited by examiner

COATED GLASS PANE

BACKGROUND OF THE INVENTION

The present invention relates to a coated glass pane, more specifically, to a heat treatable coated glass pane which possesses a protective capping layer, and which also preferably comprises a low-e and/or solar control coating. The invention also relates to a method of manufacturing said heat treatable coated glass pane.

Glass coatings which provide low-emissivity (low-e) and/or solar control may be deposited for example by physical vapour deposition (PVD) processes, such as, sputtering. Sputtered low-emissivity and solar control coating stacks are commonly made up of repeat sequences of for example:
'substrate/base dielectric layer sequence/[silver (Ag)/dielectric layer sequence]$_n$,', with each of the 'n' dielectrics not necessarily having the same thicknesses or composition.

There is a continual demand from the glass manufacturing industry for coated glass substrates which are able to meet the demanding performance requirements of automotive and architectural glazing with the result that, ever more complicated layer sequences (or stacks) are used to coat glass substrates based on a range of dielectric materials. Consequently, it is becoming more common in the glass manufacturing industry for 'n' in the sequence above to equal 2 or even 3.

However, as dielectric layers are thicker and slower to deposit by for example sputtering than metal layers such as silver, to deposit complicated layer sequences on a glass substrate often requires a large number of cathodes in a production coating plant.

Previously, the deposition of a large number of complicated coating stacks on a glass substrate has been addressed by installing expensive extensions to a coating line in a glass manufacturing plant, to achieve a sufficient number of cathodes to deposit the required different materials in sufficient number, thickness and order.

This has led also to the installation of extra pumping sections in the extensions, to allow the multiple reactive deposition processes to run in sequence. This however, is achieved only at great expense and often with huge disruption, as the coating line usually needs to be stopped for an extended period for the required engineering installations to be completed. Each new cathode and pumping section also requires an accompanying power supply, vacuum pumps, conveyor sections, services, instrumentation and integration into the control system. Such changes often lead to restructuring of the downstream logistics, and possibly even new civil works or building extensions. As the requirement for multiple metal layers and/or more complicated stacks becomes ever more common, these problems are set to increase.

It is a requirement also of architectural or automotive glazings to provide coated glass substrates which may be heat treatable and hence toughened to impart safety properties, and/or which may be bent into a required shape.

It is known that for thermal toughening (also known as tempering in the glass industry) and/or bending of glass panes it is necessary to heat treat the glass panes to temperatures near or above the softening point of the glass, and then to rapidly cool or bend the glass panes with the aid of suitable bending means. The toughening or bending of standard float glass of the soda lime silica type is typically achieved by heating the glass to temperatures in the region of 580 to 690° C., during which time the glass panes are kept at this temperature range for several minutes before initiating the actual toughening and/or bending process.

"Heat treatment", "heat treated" and "heat treatable" in the following description and in the claims refer to thermal bending and/or toughening processes (also known as tempering) and to other thermal processes during which a coated glass pane reaches temperatures in the range of for example 580 to 690° C. for a period of several minutes, for example, up to about 10 minutes. A coated glass pane is deemed to be heat treatable if it survives a heat treatment without significant damage. Typical damage to glass panes caused by heat treatments include for example, increased haze (or cloudiness), pinholes or spots.

The use of coated glass substrates with coating layers which comprise doped metal oxide layers is known. For example, in US 2009/0197077, there is described a transparent glass substrate provided with a thin-film multilayer comprising a functional layer based on silver or on a metal alloy containing silver, and two coatings composed of a plurality of dielectric layers, such that the functional layer of silver is placed between the two coatings. The functional layer is deposited on a wetting layer, itself deposited directly onto a subjacent coating. The subjacent coating comprises at least one dielectric layer based on nitride, and at least one non-crystalline smoothing layer made from a mixed oxide in the form of antimony doped zinc stannate, which is in contact with said superjacent wetting layer.

In U.S. Pat. No. 6,541,133, there is disclosed a layer stack for a surface coating of a transparent substrate, which has at least one metal oxide composite layer produced by reactive cathodic sputtering and which contains zinc (Zn) oxide and tin (Sn) oxide. Relative to the total amount of metal, this metal oxide composite layer may also contain from 0.5 to 6.5% by weight of one or more of the elements Al, Ga, In, B, Y, La, Ge, Si, P, As, Sb, Bi, Ce, Ti, Zr, Nb and Ta.

Likewise, in US 2006/240266, there is described a transparent substrate, which comprises a coating that contains at least one layer based on silicon or aluminum [nitride, carbonitride, oxynitride or oxycarbonitride] or on a mixture of the two, which is surmounted by an oxide-based mechanical protection layer, that advantageously contains at least one element chosen from Ti, Zn, Sn, Al, Ga, In, B, Y, La, Ge, Si, P, As, Sb, Bi, Ce, Ti, Zr, Nb, Ta and Hf.

In U.S. Pat. No. 9,315,414, there is disclosed a method for forming a low-emissivity (low-e) panel based on a transparent substrate. A metal oxide layer is formed over the transparent substrate. The metal oxide layer includes oxygen, a first element, a second element, and a third element. The first element is tin or zinc. The second element is strontium, and the third element is hafnium.

In WO 2008/010883, there is described a heat treatable coated article which comprises a zinc-doped zirconium based layer as the sole coating layer.

However, none of the prior art documents described above provide a heat treatable coated glass substrate with a layer sequence according to the present invention, which is able to provide the desired optical properties, as well as the wear and scratch resistance requirements of the glass industry.

SUMMARY OF THE INVENTION

The aim of the present invention is to therefore provide improved heat treatable coated glass panes, the optical properties of which do not change significantly or change by a reduced amount when heat-treated. For example, the colour modification of the coated glass panes caused by a heat treatment should preferably be such that if required, heat-treated and non-heat-treated coated glass panes may be glazed adjacent to each other without a noticeable colour difference in use.

It is also the aim of the present invention to provide heat treatable, low emissivity (low-e) and/or solar control coated glass substrates which are able to withstand ordinary environmental influences during for example, storage, transport and use, both before and after a heat treatment. Moreover, the aim of the present invention is to provide heat treatable, low emissivity (low-e) and/or solar control coated glass substrates which are able to survive mechanical and chemical conditions acting on the coated glass panes during usual handling and processing without significant damage, as detailed below in relation to a series of tests.

The invention furthermore aims to provide heat treatable coated glass panes which either have a high light transmittance and a low emissivity (corresponding to a low sheet resistance) and/or which show good solar control properties, that is, the glass panes have a low solar energy transmittance combined with a sufficiently high light transmittance.

In summary, the present invention aims to address the problems associated with prior art processes and products as detailed above, and which seeks to deliver economically efficient and commercially desirable coated glass substrates which meet the required optical properties of the glass industry in terms of for example, haze, light transmittance and colour, and which are also robust enough to withstand thermal toughening.

According to a first aspect of the present invention there is provided a coated glass pane comprising at least the following layers in sequence:
 a glass substrate;
 a lower anti-reflection layer;
 a silver-based functional layer;
 a barrier layer;
 an upper dielectric layer; and
 a topmost dielectric layer which comprises an oxide of zinc (Zn), tin (Sn) and zirconium (Zr); and wherein the amount of zirconium in the topmost dielectric layer comprises at least 10 atomic percent zirconium.

In the coated glass pane according to the first aspect of the present invention, the topmost dielectric layer preferably comprises a layer based on an oxide of zinc (Zn), tin (Sn) and zirconium (Zr) in an amount which comprises at least 12 atomic percent zirconium. More preferably the topmost dielectric layer comprises a layer based on an oxide of zinc (Zn), tin (Sn) and zirconium (Zr) in an amount which comprises at least 15 atomic percent zirconium. Most preferably the topmost dielectric layer comprises a layer based on an oxide of zinc (Zn), tin (Sn) and zirconium (Zr) in an amount which comprises at least 18 atomic percent zirconium.

Also, in relation to the first aspect of the present invention the topmost dielectric layer preferably comprises a layer based on an oxide of zinc (Zn), tin (Sn) and zirconium (Zr) in an amount which comprises at most, 35 atomic percent zirconium. More preferably, the topmost dielectric layer comprises a layer based on an oxide of zinc (Zn), tin (Sn) and zirconium (Zr) in an amount which comprises at most 33 atomic percent zirconium.

Therefore, in a preferred embodiment of the present invention the topmost dielectric layer in the coated glass pane may preferably comprise a layer based on an oxide of zinc (Zn), tin (Sn) and zirconium (Zr) in an amount which comprises in the range 12 atomic percent zirconium to 35 atomic percent zirconium. More preferably, the topmost dielectric layer in the coated glass pane preferably comprises a layer based on an oxide of zinc (Zn), tin (Sn) and zirconium (Zr) in an amount which comprises in the range 15 atomic percent zirconium to 33 atomic percent zirconium. Most preferably, the topmost dielectric layer in the coated glass pane preferably comprises a layer based on an oxide of zinc (Zn), tin (Sn) and zirconium (Zr) in an amount which comprises in the range 18 atomic percent zirconium to 33 atomic percent zirconium.

Also in relation to the present invention, the lower anti-reflection layer may preferably comprise in sequence from the glass substrate; a layer based on an oxide of zinc (Zn) and tin (Sn) and/or an oxide of tin (Sn); a separation layer; and a top layer based on an oxide of Zn, or alternatively, the lower anti-reflection layer may preferably comprise in sequence from the glass substrate; a layer based on an oxide of zinc (Zn) and tin (Sn) and/or an oxide of tin (Sn); and a top layer based on an oxide of Zn.

The lower anti-reflection layer may also preferably comprise one or more base layer based on an (oxi)nitride of silicon, an (oxi)nitride of aluminium and/or alloys thereof. The one or more base layer based on an (oxi)nitride of silicon, an (oxi)nitride of aluminium and/or alloys thereof is preferably located between the glass substrate and the layer based on an oxide of zinc (Zn) and tin (Sn) and/or an oxide of tin (Sn) in the lower anti-reflection layer.

Therefore, in an embodiment of the present invention the coated glass pane preferably comprises a base layer based on an (oxi)nitride of silicon and/or an (oxi)nitride of aluminium and/or alloys thereof located between the glass substrate and the lower anti-reflection layer, said lower anti-reflection layer comprising either:
 a layer based on an oxide of zinc (Zn) and tin (Sn) and/or an oxide of tin (Sn); a separation layer; and a top layer based on an oxide of zinc (Zn); or,
 a layer based on an oxide of zinc (Zn) and tin (Sn) and/or an oxide of tin (Sn); and a top layer based on an oxide of zinc (Zn).

Therefore, the lower anti-reflection layer preferably comprises, in direct sequence from the glass substrate:
 a base layer based on an (oxi)nitride of silicon and/or an (oxi)nitride of aluminium and/or alloys thereof;
 a layer based on an oxide of zinc (Zn) and tin (Sn) and/or an oxide of tin (Sn);
 a separation layer based on a metal oxide and/or an (oxi)nitride of silicon and/or an (oxi)nitride of aluminium and/or alloys thereof; and
 a top layer based on an oxide of Zn, or,
 the lower anti-reflection layer preferably comprises, in direct sequence from the glass substrate,
 a base layer based on an (oxi)nitride of silicon and/or an (oxi)nitride of aluminium and/or alloys thereof;
 a layer based on an oxide of zinc (Zn) and tin (Sn) and/or an oxide of tin (Sn);
 and
 a top layer based on an oxide of Zn.

That is, the lower anti-reflection layer may preferably consist of either three or four layers in sequence as described above. Whether the lower anti-reflection layer preferably consists of either three or four layers as described above will depend upon the number of silver-based functional layers present in the sequence.

It is preferred that when the coating sequence comprises only a single silver-based coating layer that the lower anti-reflection layer preferably consists of four layers in sequence as described above. However, when the coating sequence comprises more than one silver-based coating layer, the lower anti-reflection layer preferably consists of three layers in sequence as described above.

The base layer based on an (oxi)nitride of silicon and/or an (oxi)nitride of aluminium and/or alloys thereof of the lower anti-reflection layer may preferably comprise a thickness of at least 5 nm. More preferably, the base layer based on an (oxi)nitride of silicon and/or an (oxi)nitride of aluminium and/or alloys thereof of the lower anti-reflection layer comprises a thickness of from 5 to 60 nm. Even more preferably the base layer based on an (oxi) nitride of silicon and/or an (oxi)nitride of aluminium and/or alloys thereof of the lower anti-reflection layer comprises a thickness of from: 10 to 50 nm; 15 to 45 nm; or 20 to 40 nm. Most preferably the base layer based on an (oxi)nitride of silicon and/or an (oxi)nitride of aluminium and/or alloys thereof of the lower anti-reflection layer comprises a thickness of from 25 to 35 nm. This base layer serves as a glass side diffusion barrier amongst other uses. That is, the layer preferably prevents the diffusion of for example alkali metal ions, such as sodium ions, from the glass substrate into the coating sequence.

The term "(oxi)nitride of silicon" encompasses both silicon (Si) nitride ($SiN_x$) and silicon (Si) oxinitride ($SiO_xN_y$), whilst the term "(oxi)nitride of aluminium" encompasses both aluminium (Al) nitride ($AlN_x$) and aluminium (Al) oxinitride ($AlO_xN_y$). Silicon (Si) nitride, silicon (Si) oxinitride, aluminium (Al) nitride and aluminium (Al) oxinitride layers are preferably essentially stoichiometric (for example, in silicon nitride=$Si_3N_4$, the value of x in $SiN_x$=1.33) but may also be substoichiometric or even super-stoichiometric, as long as the heat treatability of the coating is not negatively affected thereby. One preferred composition of the base layer based on an (oxi)nitride of silicon and/or an (oxi) nitride of aluminium of the lower anti-reflection layer is an essentially stoichiometric mixed nitride $Si_{90}Al_{10}N_x$.

Layers of an (oxi)nitride of silicon and/or an (oxi)nitride of aluminium may be reactively sputtered from silicon (Si-) and/or aluminium (Al)-based targets respectively in a sputtering atmosphere containing nitrogen and argon. An oxygen content of the base layer based on an (oxi)nitride of silicon and/or an (oxi)nitride of aluminium may result from residual oxygen in the sputtering atmosphere or from a controlled content of added oxygen in said atmosphere. It is generally preferred if the oxygen content of the silicon (oxi)nitride and/or aluminium (oxi)nitride is significantly lower than its nitrogen content, that is, if the atomic ratio O/N in the layer is kept significantly below 1. It is most preferred to use Si nitride and/or aluminium nitride with negligible oxygen content for the base layer of the lower anti-reflection layer. This feature may be controlled by making sure that the refractive index of the layer does not differ significantly from the refractive index of an oxygen-free Si nitride and/or aluminium nitride layer.

It is within the scope of the invention to use mixed silicon (Si) and/or aluminium (Al) targets or to otherwise add metals or semiconductors to the silicon (Si) and/or aluminium (Al) component of this layer as long as the essential barrier and protection property of the base layer of the lower anti-reflection layer is not lost. For example, the aluminium (Al) with silicon (Si) targets may be mixed, other mixed targets not being excluded. Additional components may be typically present in amounts of from 10 to 15 weight %. Aluminium is usually present in mixed silicon targets in an amount of 10 weight %.

The layer based on an oxide of zinc (Zn) and tin (Sn) and/or an oxide of tin (Sn) of the lower anti-reflection layer preferably serves to improve stability during a heat treatment by providing a dense and thermally stable layer and contributing to reduce the haze after a heat treatment. The layer based on an oxide of zinc (Zn) and tin (Sn) and/or an oxide of tin (Sn) of the lower anti-reflection layer may preferably have a thickness of at least 0.5 nm. Preferably the layer based on an oxide of zinc (Zn) and tin (Sn) and/or an oxide of tin (Sn) of the lower anti-reflection layer may have a thickness of from: 0.5 to 15 nm; or 0.5 to 13 nm; or 1 to 12 nm. In addition, the layer based on an oxide of zinc (Zn) and tin (Sn) and/or an oxide of tin (Sn) of the lower anti-reflection layer may have a thickness of from: 1 to 7 nm; or 2 to 6 nm; or 3 to 6 nm. Most preferably the layer based on an oxide of zinc (Zn) and tin (Sn) and/or an oxide of tin (Sn) of the lower anti-reflection layer may have a thickness of from 3 to 5 nm for a coated glass pane with layer sequence comprising a single silver-based functional layer. An upper thickness limit in the region of 8 nm is preferred due to optical interference conditions and by a reduction of heat treatability due to the resulting reduction in the thickness of the base layer that would be needed to maintain the optical interference boundary conditions for anti-reflecting the functional layer.

In an alternative embodiment in relation to the first aspect of the present invention, when the coated glass pane comprises more than one silver-based functional layer, the layer based on an oxide of zinc (Zn) and tin (Sn) and/or an oxide of tin (Sn) of the lower anti-reflection layer preferably has a thickness of at least 12 nm. More preferably, the layer based on an oxide of zinc (Zn) and tin (Sn) and/or an oxide of tin (Sn) of the lower anti-reflection layer preferably has a thickness of from 12 nm to 20 nm. Even more preferably, the layer based on an oxide of zinc (Zn) and tin (Sn) and/or an oxide of tin (Sn) of the lower anti-reflection layer preferably has a thickness of from 12 nm to 16 nm. However, most preferably, the layer based on an oxide of zinc (Zn) and tin (Sn) and/or an oxide of tin (Sn) of the lower anti-reflection layer preferably has a thickness of from 12 nm to 14 nm.

The layer based on an oxide of zinc (Zn) and tin (Sn) and/or an oxide of tin (Sn) of the lower anti-reflection layer is preferably located directly on the base layer based on an (oxi)nitride of silicon and/or an (oxi)nitride of aluminium and/or alloys thereof.

The layer based on an oxide of zinc (Zn) and tin (Sn) (abbreviation: $ZnSnO_x$) of the lower anti-reflection layer may preferably comprise: 10 to 90 weight % zinc (Zn) and 90 to 10 weight % tin (Sn); more preferably about 40 to 60 weight % zinc (Zn) and about 60 to 40 weight % tin (Sn); even more preferably about 50 weight % each of zinc (Zn) and tin (Sn), in weight % of the total metal content of the layer. In some preferred embodiments the layer based on an oxide of zinc (Zn) and tin (Sn) of the lower anti-reflection layer may comprise: at most 18 weight % tin (Sn), more preferably at most 15 weight % tin (Sn), even more preferably at most 10 weight % tin (Sn). The layer based on an oxide of Zn and Sn may also preferably be deposited by reactive sputtering of a mixed ZnSn target in the presence of O2.

The separation layer of the lower dielectric layer may preferably be based on a metal oxide and/or an (oxi)nitride of silicon and/or an (oxi)nitride of aluminium and/or alloys thereof.

In addition, the separation layer may preferably have a thickness of at least 0.5 nm; or preferably from 0.5 to 6 nm; more preferably from 0.5 to 5 nm; even more preferably from 0.5 to 4 nm; most preferably from 0.5 to 3 nm. These preferred thicknesses enable further improvement in haze upon heat treatment. The separation layer preferably provides protection during the deposition process and during a subsequent heat treatment. The separation layer is preferably either essentially fully oxidised immediately after deposition, or it oxidizes to an essentially fully oxidized layer during deposition of a subsequent oxide layer.

When the separation layer is based on a metal oxide said separation layer may preferably comprise a layer based on an oxide of: Ti, Zn, NiCr, InSn, Zr, Al and/or Si.

When the separation layer is preferably based on a metal oxide, it may be deposited using non-reactive sputtering from a ceramic target based on for example a slightly substoichiometric titanium oxide, for example a $TiO_{1.98}$ target, as an essentially stoichiometric or as a slightly substoichiometric oxide, by reactive sputtering of a target based on Ti in the presence of $O_2$, or by depositing a thin layer based on Ti which is then oxidised. In the context of the present invention, an "essentially stoichiometric oxide" means an oxide that is at least 95% but at most 100% stoichiometric, whilst a "slightly substoichiometric oxide" means an oxide that is at least 95% but less than 100% stoichiometric.

In addition to the metal oxide and/or (oxi)nitride of silicon and/or (oxi)nitride of aluminium and/or alloys thereof upon which it is based, the separation layer may further include one or more other chemical elements chosen from at least one of the following elements: Ti, V, Mn, Co, Cu, Zn, Zr, Hf, Al, Nb, Ni, Cr, Mo, Ta, Si, or from an alloy based on at least one of these materials, used for instance as dopants or alloyants.

Preferably however, the separation layer based on a metal oxide and/or (oxi)nitride of silicon and/or (oxi)nitride of aluminium does not include one or more other chemical elements.

In one preferred embodiment of the present invention, the separation layer is based on a metal oxide, which comprises an oxide of zinc (Zn) and/or an oxide of titanium.

In another preferred embodiment of the present invention, the separation layer is based on a metal oxide, which comprises an oxide of titanium.

It is especially preferred that the separation layer is based on an oxide of titanium when the layer sequence of the coated glass comprises one silver-based functional layer.

Whilst the separation layer may also be based on an oxide of titanium when the layer sequence comprises more than one silver-based functional layer, it may also be preferred that when the layer sequence or stack comprises more than one silver-based functional layer that the layer sequence does not comprise a separation layer in the lower anti-reflection layer.

In addition, it is preferred that when the separation layer is based on a metal oxide and that the metal oxide is based on titanium oxide, that the titanium oxide has a preferred thickness of from 0.5 to 3 nm.

The top layer based on an oxide of zinc (Zn) primarily functions as a growth promoting layer for a subsequently deposited silver-based functional layer. The top layer based on an oxide of zinc (Zn) is optionally mixed with metals such as aluminium (Al) or tin (Sn) in an amount of up to about 10 weight % (weight % referring to the target metal content). A typical content of said metals such as aluminium (Al) or tin (Sn) is about 2 weight %, Aluminium (Al) being preferred. Zinc oxide (ZnO) and mixed zinc (Zn) oxides have proven very effective as a growth promoting layer and thereby assisting in achieving a low sheet resistance at a given thickness of the subsequently deposited silver-based functional layer. It is preferred if the top layer based on an oxide of zinc (Zn) of the lower anti-reflection layer is reactively sputtered from a zinc (Zn) target in the presence of oxygen ($O_2$), or if it is deposited by sputtering, a ceramic target, for example based on ZnO:Al, in an atmosphere containing zero or only a small amount of oxygen, that is, generally no more than about 5 volume %, of oxygen. The top layer of the lower anti-reflection layer based on an oxide of zinc (Zn) may preferably have a thickness of at least 2 nm. More preferably, the top layer of the lower anti-reflection layer based on an oxide of zinc (Zn) may preferably have a thickness of from 2 to 15 nm; or from 3 to 12 nm. Even more preferably the top layer of the lower anti-reflection layer based on an oxide of zinc (Zn) may preferably have a thickness of from 4 to 10 nm. Most preferably the top layer of the lower anti-reflection layer based on an oxide of zinc (Zn) has a thickness of from 5 to 8 nm.

The silver-based functional layer(s) preferably consists essentially of silver without any additive, as is normally the case in the area of low-emissivity and/or solar control coatings. It is, however, within the scope of the invention to modify the properties of the silver-based functional layer(s) by adding doping agents, alloy additives or the like or even adding very thin metal or metal compound layers, as long as the properties of the silver-based functional layer(s) necessary to function as highly light-transmitting and low light-absorbent IR-reflective layer(s), are not substantially impaired thereby.

The thickness of each silver-based functional layer is dominated by its technical purpose. For typical low-emissivity and/or solar control purposes the preferred layer thickness for a single silver-based layer may preferably be from: 5 to 20 nm; more preferably from 5 to 15 nm; even more preferably from 5 to 13 nm; even more preferably from 8 to 12 nm; most preferably from 9 to 11 nm. With such a layer thickness, light transmittance values of above 86% and a normal emissivity below 0.05 after a heat treatment may be readily achieved in accordance with the present invention for single silver coatings. If superior solar control properties are required, the thickness of the silver-based functional layer may be adequately increased or several spaced functional layers may be provided as further explained below.

Preferably the top layer based on an oxide of zinc (Zn) in the lower anti-reflection layer is in direct contact with the silver-based functional layer. Preferably, the layers between the glass substrate and the silver-based functional layer may consist of the three layers or four layers of the lower anti-reflection layer described above.

While the invention is directed to coated panes with only one silver-based functional layer, it is within the scope of the invention to apply the inventive concept to prepare low-emissivity and/or solar control coatings comprising two or more silver-based functional layers. When providing more than one silver-based functional layer, all of the silver-based functional layers are spaced apart by intervening dielectric layers, referred to herein collectively as "central anti-reflection layers", to form a Fabry-Perot interference filter, whereby the optical properties of the low emissivity and/or solar control coating may be further optimized for the respective application.

Preferably, each silver-based functional layer is spaced apart from an adjacent silver-based functional layer by an intervening central anti-reflection layer. The intervening central anti-reflection layer(s) may comprise a combination of one or more of the following layers: a layer based on an (oxi)nitride of silicon and/or an (oxi)nitride of aluminium; a layer based on an oxide of Zn and Sn and/or an oxide of Sn; and a layer based on a metal oxide such as an oxide of Zn.

In some preferred embodiments each silver-based functional layer is spaced apart from an adjacent silver-based functional layer by an intervening central anti-reflection layer, wherein each central anti-reflection layer comprises at least, in sequence from the silver-based functional layer that is located nearest to the glass substrate, a layer based on an (oxi)nitride of silicon and/or an (oxi)nitride of aluminium; a layer based on an oxide of Zn and Sn and/or an oxide of Sn; and a layer based on a metal oxide such as an oxide of Zn.

The coated glass pane according to the first aspect of the present invention preferably comprises also a barrier layer. The barrier layer is preferably located in direct contact with the silver based functional layer.

The barrier layer may preferably be based on an oxide of Zn with a thickness of: at least 0.5 nm, more preferably, the barrier layer is based on an oxide of Zn with a thickness of from 0.5 to 10 nm. Most preferably the barrier layer is based on an oxide of Zn with a thickness of from 1 to 10 nm.

It has been found that a superior protection of the silver-based functional layer during the deposition process and a high optical stability during a heat treatment may be achieved if the barrier layer comprises a layer of a mixed metal oxide sputtered from a mixed metal oxide target. When the barrier layer is based on an oxide of zinc (Zn), said oxide may be a mixed metal oxide such as ZnO:Al. Good results are particularly achieved if a layer based on ZnO:Al is sputtered from a conductive ZnO:Al target. ZnO:Al may be deposited fully oxidized or such that it is slightly sub-oxidic.

In addition, it is possible when the barrier layer comprises a layer based on an oxide of zinc (Zn) for the barrier to actually comprise a number of zinc oxide layers such as layers based not only on a mixed metal oxide such as ZnO:Al, but also on an oxide of zinc (Zn) and tin (Sn). Suitable barrier layers may therefore be in the form of ZnO:Al, ZnSnO$_4$, ZnO:Al. Such triple barrier arrangements may have a combined thickness of between 3 and 12 nm.

Further triple barrier arrangements may preferably be selected from the group consisting of the following combinations of layers in sequence from the silver-based functional layer: ZnO:Al/TiO$_x$/ZnO:Al, ZnO:Al/ZnSnO$_x$/ZnO:Al, TiO$_x$/ZnSnO$_x$/ZnO:Al, TiO$_x$/ZnO:Al/TiO$_x$, TiO$_x$/ZnSnO$_x$/TiO$_x$, and ZnO:Al/ZnSnO$_x$/TiO$_x$.

At least a portion of the barrier layer that is in direct contact with the silver-based functional layer is preferably deposited using non-reactive sputtering of an oxidic target to avoid silver damage.

In addition, and as an alternative to the barrier layer being based on an oxide of zinc (Zn), it has further been found that suitable protection of the silver-based functional layer during the deposition process and a high optical stability during heat treatment may be achieved also if the barrier layer comprises a mixed metal oxide based on Nickel (Ni) and Chromium, such as a layer of substoichiometric NiCrO$_x$. This is especially the case when the coated glass pane comprises two or more silver-based functional layers, however, the layer of substoichiometric NiCrO$_x$ may also be used when the coated glass pane comprises a single silver-based functional layer.

Therefore, for coated glass panes comprising two or more silver based functional layers it is preferred if each silver-based functional layer is spaced apart from an adjacent silver-based functional layer by an intervening central anti-reflection layer, wherein each central anti-reflection layer comprises at least, in sequence from the silver-based functional layer that is located nearest to the glass substrate:
a layer based on a mixed metal oxide comprising nickel (Ni) and chromium;
a layer based on a mixed metal oxide based on zinc and aluminium, that is ZAO;
a layer based on an (oxi)nitride of silicon and/or an (oxi)nitride of aluminium;
a layer based on an oxide of Zn and Sn and/or an oxide of Sn; and
a layer based on a metal oxide such as an oxide of Zn.

Also, in relation to the first aspect of the present invention the coated glass preferably comprises an upper dielectric layer. The upper dielectric layer preferably comprises:
i) an uppermost barrier layer based on an oxide of nickel (Ni) and chromium or an oxide of zinc doped with aluminium (Al);
ii) a layer based on an oxide of zinc (Zn) and tin (Sn) or a layer based on zinc and aluminium, or a nitride of tungsten; and
iii) a layer based on an (oxi)nitride of silicon and/or an (oxi)nitride of aluminium, or a layer based on zinc and aluminium.

The layer based on an oxide of Zn and Sn and/or an oxide of Sn in the upper dielectric layer may preferably have a thickness of at least 0.5 nm; more preferably at least 0.5 nm or 1 nm, or even at least 1.5 nm, but preferably less than 5 nm; more preferably at most 4 nm; even more preferably less than 4 nm; most preferably at most 3 nm; and especially 2 nm. These preferred thicknesses enable further ease of deposition and improvement in optical characteristics such as haze whilst retaining mechanical durability.

The layer based on an oxide of Zn in the upper dielectric layer may preferably have a thickness of at least 0.5 nm, more preferably at least 0.5 nm or 1 nm; or even at least 1.5 nm; but preferably less than 5 nm; more preferably 4 nm. These preferred thicknesses also enable further ease of deposition and improvement in optical characteristics such as haze whilst retaining mechanical durability.

Preferably the layers in the upper dielectric layer are based on essentially stoichiometric metal oxides. The use of barrier layers based on essentially stoichiometric metal oxides rather than metallic or less than 95% stoichiometric barrier layers leads to an extremely high optical stability of the coating during a heat treatment and effectively assists in keeping optical modifications during heat treatment small. Additionally the use of layers based on essentially stoichiometric metal oxides provides benefits in terms of mechanical robustness.

In the context of the present invention the term "non-reactive sputtering" includes sputtering an oxidic target in a low oxygen atmosphere (that is with zero, or up to 5% volume oxygen) to provide an essentially stoichiometric oxide.

Also in the context of the present invention, where a layer is said to be "based on" a particular material or materials, this means unless stated otherwise, the layer predominantly comprises said material or materials in an amount of at least 50 atomic %.

Where a layer is based on ZnSnO$_x$, "ZnSnO$_x$" means a mixed oxide of Zn and Sn as described and defined elsewhere in the description.

The layer in the upper anti-reflection layer based on an (oxi)nitride of aluminium or an (oxi)nitride of silicon may preferably comprise a thickness of at least 5 nm; preferably from 5 to 50 nm; more preferably from 10 to 40 nm; even more preferably from 10 to 30 nm; most preferably from 15 to 30 nm. Such thicknesses provide further improvement in terms of mechanical robustness of the coated pane. Said layer based on an (oxi)nitride of aluminium, an (oxi)nitride of silicon, may preferably be in direct contact with the layer based on an oxide of zinc (Zn) in the upper dielectric layer.

The layer based on an (oxi)nitride of aluminium, an (oxi)nitride of silicon, may comprise a major part of the upper anti-reflection layer and provide stability (better protection during heat treatments) and diffusion barrier properties. Said layer is preferably deposited as an Al nitride and/or Si nitride layer by reactive sputtering of a Si, Al or mixed SiAl target, for example, of a $Si_{90}Al_{10}$ target in a $N_2$ containing atmosphere. The composition of the layer based on an (oxi)nitride of aluminium and/or an (oxi)nitride of silicon may be essentially stoichiometric $Si_{90}Al_{10}N_x$.

The topmost dielectric layer which comprises at least 10 atomic percent zirconium is present as a protective layer for increased mechanical and/or chemical robustness, for example scratch resistance.

To minimize any light absorption in the coating and to reduce the light transmittance increase during heat treatment, all individual layers of the upper and lower anti-reflection layers are preferably deposited with an essentially stoichiometric composition.

To further optimize the optical properties of the coated pane the upper anti-reflection layers may comprise further partial layers consisting of suitable materials generally known for dielectric layers of low-e and/or solar control coatings, in particular chosen from one or more of the oxides of Sn, Ti, Zn, Nb, Ce, Hf, Ta, Zr, Al and/or Si and/or of (oxi)nitrides of Si and/or Al or combinations thereof. When adding such further partial layers it should however be verified that the heat treatability aimed at herein is not impaired thereby.

It will be appreciated that any further layer may contain additives that modify its properties and/or facilitate its manufacture, for example, doping agents or reaction products of reactive sputtering gases. In the case of oxide based layers, nitrogen may be added to the sputtering atmosphere leading to the formation of oxinitrides rather than oxides, in the case of nitride based layers oxygen may be added to the sputtering atmosphere, also leading to the formation of oxinitrides rather than nitrides.

Care must be taken by performing a proper material, structure and thickness selection when adding any such further partial layer to the basic layer sequence of the inventive pane that the properties primarily aimed at, for example, a high thermal stability, are not significantly impaired thereby.

According to a second aspect of the present invention there is provided a method of manufacturing a coated glass pane according to a first aspect of the present invention comprising:
  i) providing a glass substrate;
  ii) providing a lower anti-reflection layer;
  iii) providing a silver-based functional layer;
  iv) providing a barrier layer; and
  v) providing an upper dielectric layer; and
  vi) providing a topmost dielectric layer which an oxide of zinc (Zn), tin (Sn) and zirconium (Zr); and wherein the amount of zirconium in the layer comprises at least 10 atomic percent zirconium; and wherein any portion of the barrier layer that is in direct contact with the silver-based functional layer is deposited by sputtering in an atmosphere with from zero to 5 volume percent oxygen.

In relation to the second aspect of the present invention, the lower anti-reflection layer and the upper dielectric layer, silver-based functional layer, barrier layer and topmost dielectric layer, may be as described in relation to the first aspect of the present invention.

The invention is not limited to a specific production process for the coating. However, it is particularly preferred if at least one of the layers and most preferably all layers are applied by magnetron cathode sputtering, either in the DC mode, in the pulsed mode, in the medium frequency mode or in any other suitable mode, whereby metallic or semi-conducting targets are sputtered reactively or non-reactively in a suitable sputtering atmosphere. Depending on the materials to be sputtered, planar or rotating tubular targets may be used.

For instance, the layers based on an oxide of Zn, Ti, ZnSn, InSn, Zr, Al, Sn and/or Si, and/or an (oxi)nitride of Si and/or of Al, may be deposited by non-reactive sputtering. Said layers may be sputtered from ceramic targets.

Alternatively, the layers based on an oxide of Zn, Ti, ZnSn, InSn, Zr, Al, Sn and/or Si, and/or an (oxi)nitride of Si and/or of Al, may also be deposited for instance by reactive sputtering. Said layers may be sputtered from one or more metal targets.

The coating process is preferably carried out by setting up suitable coating conditions such that any oxygen (or nitrogen) deficit of any oxide (or nitride) layer of the anti-reflection layers of the coating is kept low, to achieve a high stability of the light transmittance and colour of the coated glass panes during heat treatment. Light transmittance values referred to in the specification are generally specified with reference to a coated glass pane comprising a 4 mm thick standard float glass pane having a light transmittance $T_L$ in the region of 90% without a coating.

While a neutral reflection and transmission colour of the coated glass panes is usually aimed at, the colour of the coated glass panes according to the invention may be varied widely by adapting the thicknesses of the individual layers appropriately according to the intended visual appearance of the product.

The thermal stability of coated glass panes according to the invention is reflected by the fact that the heat treated coated glass panes do not exhibit unacceptable levels of haze. Large increases in the haze value (hazescan) if detected during a heat treatment would indicate that the coating is beginning to be damaged. The mechanical durability of coated glass panes according to the invention may be exemplified by performance in oil rub tests.

According to a third aspect of the present invention there is provided a multiple glazing unit incorporating a coated glass pane in accordance with all features described above according to the first and/or second aspects of the present invention. In addition, the multiple glazing unit according to the third aspect of the present invention may be a laminated glazing unit or an insulated glazing unit.

BRIEF DESCRIPTION OF THE DRAWINGS

Embodiments of the present invention will now be described herein, by way of the non-limiting examples and with reference to FIGS. 1 and 2.

DETAILED DESCRIPTION OF THE INVENTION

Embodiments of the present invention will now be described herein, by way of example only:

For all Examples the coatings were deposited on 4 mm thick standard float glass panes with a light transmittance in the region of 90% using AC and/or DC magnetron (or pulsed DC) sputtering devices, medium-frequency sputtering being applied where appropriate.

Dielectric layers of an oxide of zinc (Zn) and tin (Sn) were reactively sputtered from zinc-tin targets (weight ratio Zn:Sn approximately 50:50) in an argon/oxygen (Ar/O$_2$) sputter atmosphere.

Dielectric layers of an oxide of zinc (Zn), tin (Sn) and zirconium (Zr) were co-sputtered using metallic ZnSn (weight ratio Zn:Sn approximately 50:50) and Zr targets in an Ar/O$_2$ or pure argon (Ar) atmosphere.

The titanium oxide (TiO$_x$) layers were deposited from metallic titanium (Ti) targets in an argon/oxygen (Ar/O$_2$) sputter atmosphere.

The ZnO:Al growth promoting top layers of the lower anti-reflection layers were sputtered from Al-doped Zn targets (aluminium (Al) content about 2 weight %) in an Ar/O$_2$ sputter atmosphere.

The functional layers that in all Examples consisted of essentially pure silver (Ag) were sputtered from silver targets in an Ar sputter atmosphere without any added oxygen and at a partial pressure of residual oxygen below 10$^{-5}$ mbar.

The barrier layers of Al-doped zinc oxide (ZnO:Al) (also referred to as ZAO), located above the silver-based functional layers, were sputtered from conductive ZnOx:Al targets in a pure Argon (Ar) sputter atmosphere without added oxygen.

The layers of mixed silicon aluminium nitride (Si$_{90}$Al$_{10}$N$_x$) were reactively sputtered from mixed Si$_{90}$Al$_{10}$ targets in an Argon/Nitrogen (Ar/N$_2$) sputter atmosphere containing only residual oxygen.

The layers of AlN were reactively sputtered from an Al target in an Argon/Nitrogen (Ar/N$_2$) sputter atmosphere containing only residual oxygen.

TABLE 1

|  | Example 1 Comparative | Example 2 Comparative | Example 3 Comparative | Example 4 | Example 5 |
|---|---|---|---|---|---|
|  | Si$_{90}$Al$_{10}$N$_x$ (33) | Si$_{90}$Al$_{10}$N$_x$ (33) | Si$_{90}$Al$_{10}$N$_x$ (33) | Si$_{90}$Al$_{10}$N$_x$ (33) | Si$_{90}$Al$_{10}$N$_x$ (33) |
|  | ZnSnO$_x$ (4) | ZnSnO$_x$ (4) | ZnSnO$_x$ (4) | ZnSnO$_x$ (4) | ZnSnO$_x$ (4) |
|  | TiO$_x$ (2) | TiO$_x$ (2) | TiO$_x$ (2) | TiO$_x$ (2) | TiO$_x$ (2) |
|  | ZnO:Al (7) | ZnO:Al (7) | ZnO:Al (7) | ZnO:Al (7) | ZnO:Al (7) |
|  | Ag (9) | Ag (9) | Ag (9) | Ag (9) | Ag (9) |
|  | ZnO:Al (2) | ZnO:Al (2) | ZnO:Al (2) | ZnO:Al (2) | ZnO:Al (2) |
|  | ZnSnO$_x$ (2) | ZnSnO$_x$ (2) | ZnSnO$_x$ (2) | ZnSnO$_x$ (2) | ZnSnO$_x$ (2) |
|  | ZnO:Al (4) | ZnO:Al (4) | ZnO:Al (4) | ZnO:Al (4) | ZnO:Al (4) |
|  | Si$_{90}$Al$_{10}$N$_x$ (25) | Si$_{90}$Al$_{10}$N$_x$ (25) | Si$_{90}$Al$_{10}$N$_x$ (25) | Si$_{90}$Al$_{10}$N$_x$ (25) | Si$_{90}$Al$_{10}$N$_x$ (25) |
|  | ZnSnO$_x$ (8) | ZnSnO$_x$ (8) |  | ZnSnZrO$_x$ (12) | ZnSnZrO$_x$ (12) |
|  |  |  | ZrO$_x$ (4) | ZrO$_x$ (12) |  |
| Outer-most layer metal content | 33 at. % Zn, 15 at. % Sn | 34% Zr | 34% Zr | 29 at. % Zr 3 at. % Zn 3 at. % Sn | 21 at. % Zr 10 at. % Zn 7 at. % Sn |
| Sliding angle (°) | 45 | 36 | 43 | 33-37 | 41 |
| Scratch load (N) | 0.3 | 0.8 | 1.3 | 1.2 | 1.0 |
| T$_L$ | 87.2 | 87.7 | 87.6 | 87.2 | 87.5 |
| ΔT$_L$ | 3.0 | 2.2 | 2.2 | 2.1 | 2.1 |
| Rs AD (ohm/sq) | 6.65 | 5.82 | 6.21 | 6.22 | 5.77 |
| Rs HT (ohm/sq) | 4.26 | — | 4.74 | 4.11 | 3.78 |
| ΔRs (ohm/sq) | 2.4 | — | 1.5 | 2.1 | 2 |
| T ΔE* | 1.39 | 1.24 | 1.35 | 1.10 | 1.13 |
| Oil-rub | 0 | 3 | 2 | 3 | 6 |
| Hazescan | 68 | 94 | 75 | 70 | 70 |

TABLE 2

|  | Example 6 Comparative | Example 7 Comparative | Example 8 Comparative | Example 9 |
|---|---|---|---|---|
|  | SiNx (28) | SiNx (28) | SiNx (28) | SiNx (28) |
|  | ZnSnOx (4) | ZnSnOx (4) | ZnSnOx (4) | ZnSnOx (4) |
|  | ZnOx (8) | ZnOx (8) | ZnOx (8) | ZnOx (8) |
|  | Ag (7.3) | Ag (7.3) | Ag (7.3) | Ag (7.3) |
|  | NiCrOx (1) | NiCrOx (1) | NiCrOx (1) | NiCrOx (1) |
|  | ZAO (5) | ZAO (5) | ZAO (5) | ZAO (5) |
|  | AlNx (50) | AlNx (50) | AlNx (50) | AlNx (50) |
|  | ZnSnOx (21) | ZnSnOx (21) | ZnSnOx (21) | ZnSnOx (21) |
|  | ZnOx (8) | ZnOx (8) | ZnOx (8) | ZnOx (8) |
|  | Ag (16.5) | Ag (16.5) | Ag (16.5) | Ag (16.5) |
|  | NiCrOx (1) | NiCrOx (1) | NiCrOx (1) | NiCrOx (1) |
|  | WNx (4) | WNx (4) | WNx (4) | WNx (4) |
|  | AlNx (16) | AlNx (16) | AlNx (16) | AlNx (16) |
|  | ZnSnOx (9) |  | ZnSnOx (5) | ZnSnZrOx (9) |
|  |  | ZrOx (9) | ZrOx (4) |  |
| Outer-most layer metal content | No data | 34% Zr | 34% Zr | 29 at. % Zr 3 at. % Zn 3 at. % Sn |
| Sliding angle (°) | 26 | 28 | 25 | 24 |
| Scratch load (N) | 5 | 4 | 3 | 3 |
| T$_L$ | 47.8 | 48.4 | 47.7 | 48.5 |
| ΔT$_L$ | 6.3 | 6.1 | 6.9 | 5.8 |
| Rs AD (ohm/sq) | 3.01 | 2.92 | 3.19 | 2.87 |
| Rs HT (ohm/sq) | 2.04 | 1.97 | 2.07 | 1.96 |
| ΔRs (ohm/sq) | 0.97 | 0.95 | 0.91 | 0.91 |
| T ΔE* | 8.5 | 7.8 | 11.4 | 6.7 |
| Oil-rub | 5 | 9 | 6 | 4 |
| Hazescan | 92 | 56 | 81 | 62 |

TABLE 3

|  | Example 10 Comparative | Example 11 Comparative | Example 12 Comparative | Example 13 (1 kW ZrOx) | Example 14 (2.5 kW ZrOx) |
|---|---|---|---|---|---|
|  | SiNx (20) | SiNx (20) | SiNx (20) | SiNx (20) | SiNx (20) |
|  | ZnSnOx (4) | ZnSnOx (4) | ZnSnOx (4) | ZnSnOx (4) | ZnSnOx (4) |
|  | ZnOx (8) | ZnOx (8) | ZnOx (8) | ZnOx (8) | ZnOx (8) |
|  | Ag (9.8) | Ag (9.8) | Ag (9.8) | Ag (9.8) | Ag (9.8) |
|  | NiCrOx (1) | NiCrOx (1) | NiCrOx (1) | NiCrOx (1) | NiCrOx (1) |
|  | ZAO (5) | ZAO (5) | ZAO (5) | ZAO (5) | ZAO (5) |
|  | AlNx (41) | AlNx (41) | AlNx (41) | AlNx (41) | AlNx (41) |
|  | ZnSnOx (17) | ZnSnOx (17) | ZnSnOx (17) | ZnSnOx (17) | ZnSnOx (17) |
|  | ZnOx (9) | ZnOx (9) | ZnOx (9) | ZnOx (9) | ZnOx (9) |
|  | Ag (12.5) | Ag (12.5) | Ag (12.5) | Ag (12.5) | Ag (12.5) |
|  | NiCrOx (1) | NiCrOx (1) | NiCrOx (1) | NiCrOx (1) | NiCrOx (1) |
|  | ZAO (5) | ZAO (5) | ZAO (5) | ZAO (5) | ZAO (5) |
|  | AlNx (22) | AlNx (22) | AlNx (22) | AlNx (22) | AlNx (22) |
|  | ZnSnOx (7) | ZrOx (7) | ZnSnOx (3) ZrOx (4) | ZnSnZrOx (7) | ZnSnZrOx (7) |
| Outer-most layer metal content | No data | 34% Zr | 34% Zr | 21 at. % Zr 10 at. % Zn 7 at. % Sn | 29 at. % Zr 3 at. % Zn 3 at. % Sn |
| Sliding angle (°) | 30 | 29 | 25 | 25 | 24 |
| Scratch load (N) | 8 | 4 | 4 | 7 | 8 |
| $T_L$ | 69.1 | 70.7 | 71.3 | 74.1 | 71.1 |
| $\Delta TL$ | 12.9 | 11.8 | 11.1 | 7.6 | 11.1 |
| Rs AD (ohm/sq) | 4.77 | 4.39 | 4.25 | 3.81 | 4.44 |
| Rs HT (ohm/sq) | 2.43 | 2.41 | 2.38 | 2.32 | 2.37 |
| $\Delta Rs$ (ohm/sq) | 2.34 | 1.98 | 1.87 | 1.49 | 2.07 |
| T $\Delta E^*$ | 5.60 | 5.16 | 4.89 | 3.44 | 4.87 |
| Oil-rub | 2 | 3 | 3 | 3 | 1 |
| Hazescan | 77 | 130 | 130 | 111 | 95 |

Tables 1, 2 and 3 provide details of the layer sequences for a number of comparative coated glass panes and coated glass panes according to the present invention along with the results of each stack tested for:

outermost layer metal content, hazescan, oil rub test value, sliding angle test value, scratch load test value, $T_L$%—percentage (%) light transmittance value for the glass substrate before heat treatment, $\Delta T_L$—the change in percentage (%) light transmittance upon heat treatment, Rs AD—sheet resistance before heat treatment, Rs HT—sheet resistance after heat treatment, $\Delta$ Rs (ohm/square)—change is heat resistance, and T $\Delta E^*$—which is a measure of the change in transmitted colour upon heat treatment.

The methodology used to collect the data in Tables 1, 2 and 3 is set out below. For each example, the layers were deposited on to a glass pane in the sequence shown starting with the layer at the top of each column.

Oil rub test—an oil rub test serves to simulate the influence of cutting oils used for cutting glass panes on the mechanical robustness of a coating. Coated glass panes that do not withstand an oil rub test are difficult to process and are unsuitable for most practical applications. The coated samples defined in Tables 1, 2 and 3 were rubbed using a felt pad with an area 1.2×1.2 cm soaked in microscope oil of refractive index 1.52 (1.515 to 1.517). The samples are subjected to 500 cycles with a 1,000 g load at a speed of 37 cycles per minute. The oil rubbed samples were then evaluated using an internal evaluation system on a perfectness scale of 0 (perfect, no damage) to 9 (part of coating stack completely removed). A score of 6 or less is preferred.

Heat treatability tests—immediately after deposition of all of the coatings in each example, the coating stack parameters (such as hazescan, sheet resistance (Rs), light transmittance ($T_L$)) and colour co-ordinates for the coated glass panes were measured. The samples were then heat treated in the region of 650° C. for 5 minutes. Thereafter, the hazescan value, sheet resistance (Rs), percentage light transmittance ($T_L$) and colour coordinates were again measured and the change in light transmittance ($\Delta T_L$), and the change in transmission colour upon heat treatment (T $\Delta E^*$), calculated therefrom. The measured results are also provided in Tables 1, 2 and 3 above.

The values stated for the change in percentage (%) light transmittance upon heat treatment ($\Delta T_L$) of the coated glass panes in Examples 1 to 14 were derived from measurements according to EN 140, the details of which are incorporated herein by reference.

Sheet Resistance/Change in sheet resistance—sheet resistance measurements were made using a NAGY SRM-12 for examples 1 to 14. This device utilises an inductor to generate eddy currents in a 100 m×100 mm coated sample. This produces a measureable magnetic field, the magnitude of which is related to the resistivity of the sample. With this method the sheet resistance can be calculated. The instrument was used to measure the sheet resistance of samples before and after heat treatment at 650° C. for 5 minutes.

Colour characteristics—the colour characteristics for each of sample 1 to 14 were measured and reported using the well-established CIE LAB L*, a*, b* coordinates (as described for example in paragraphs [0030] and [0031] of WO 2004/063111A1, incorporated herein by reference). The change in transmission colour upon heat treatment, T $\Delta E^*= ((\Delta a^*)^2+(\Delta b^*)^2+(\Delta L^*)^2)^{1/2}$, wherein $\Delta L^*$, $\Delta a^*$ and $\Delta b^*$ are the differences of the colour values L*, a*, b* of the coated glass pane each before and after a heat treatment. $\Delta E^*$ values of less than 3 (for example 2 or 2.5) are preferred for layer sequences with one silver-based functional layer, representing a low and practically no noticeable colour modification caused by the heat treatment. For layer sequences comprising two or more silver-based functional layer, lower T ΔE* values provide an indication of the stability of the sequences; the lower the T ΔE* values the more superior the results and appearance of the coated glass pane.

Hazescan—A haze scoring system was applied to each of Examples 1 to 14. The quality assessment evaluation system described herein was also used to more clearly distinguish the visual quality of coatings under bright light conditions; properties that are not fully reflected by standard haze values measured in accordance with ASTM D 1003-61.

The evaluation system considers the more macroscopic effect of visible faults in the coating which cause local colour variations where the coating is damaged or imperfect (hazescan in Table 1). This assessment analyses the light levels in images of heat treated samples taken using fixed lighting conditions and geometries.

To generate the images used to calculate hazescan values, samples are placed inside a black box, 30 cm away from the camera lens. Samples are illuminated using a standard 1200 lumen light with a brightness between 2400 and 2800 Lux, as measured at the samples position. The sample is then photographed using a standard aperture size and exposure length. The greyscale of each pixel in the resulting image is then recorded, with a value of 0 representing black and 255 representing white. Statistical analysis of these values is undertaken to give an overall assessment of the haze of the sample, referred to herein as the hazescan value. The lower the hazescan value recorded, the more superior the results.

AFM analysis—an atomic force microscope (AFM) was used in Peak Force Tapping mode with ScanAsyst (PFTSA) to determine the topography of a range of examples including examples 1, 2 and 4 from Table 1, along with examples 15 and 16 for which the concentration of zirconium in the uppermost layer was varied as indicated in Table 4. The mode of imaging the samples used a probe consisting of a silicon nitride cantilever with a silicon tip (radius around 2 nm). The results of the analysis are provided in Table 4.

In Table 4, Sa is the arithmetical mean height, Sq is the root mean square height, Sz (or Z-range) is the maximum peak to valley distance, Sdr (or surface area difference) is the surface area of the 'scanned' surface relative to the area of the projected flat x, y plane.

It can be seen from the results in Table 4 that examples 15 and 16 were found to be smoother in terms of all three parameters (Sa, Sq, Sz) than comparative examples 1 and 2. Also, it can be seen that reducing the amount of zirconium (Zr) in the outermost layer is detrimental to the smoothness of the uppermost layer.

TABLE 4

| | Sa (nm) | Sq (nm) | Sz (nm) | Sdr (%) |
|---|---|---|---|---|
| Example 1 (ZnSnOx top) - Comparative | 0.48 | 0.61 | 5.7 | 2.1 |
| Example 2 (Thin ZrOx top) - Comparative | 0.45 | 0.56 | 6.4 | 1.2 |
| Example 4 (ZnSnZrOx top) - 29 atomic % Zirconium (Zr) | 0.32 | 0.41 | 3.8 | 0.4 |
| Example 15 (ZnSnZrOx top) - 27 atomic % Zirconium (Zr) | 0.37 | 0.47 | 5.4 | 0.8 |
| Example 16 (ZnSnZrOx top) - 12 atomic % Zirconium (Zr) | 0.49 | 0.64 | 7.1 | 1.5 |

Figure 1:
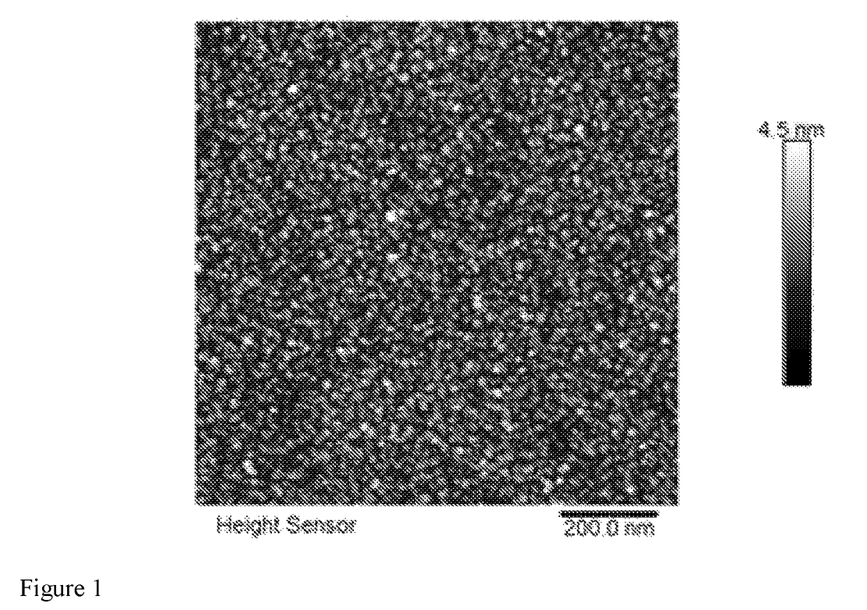
FIG. 1 is an atomic force microscope (AFM) image of the topmost surface of comparative example 1.
Figure 2:
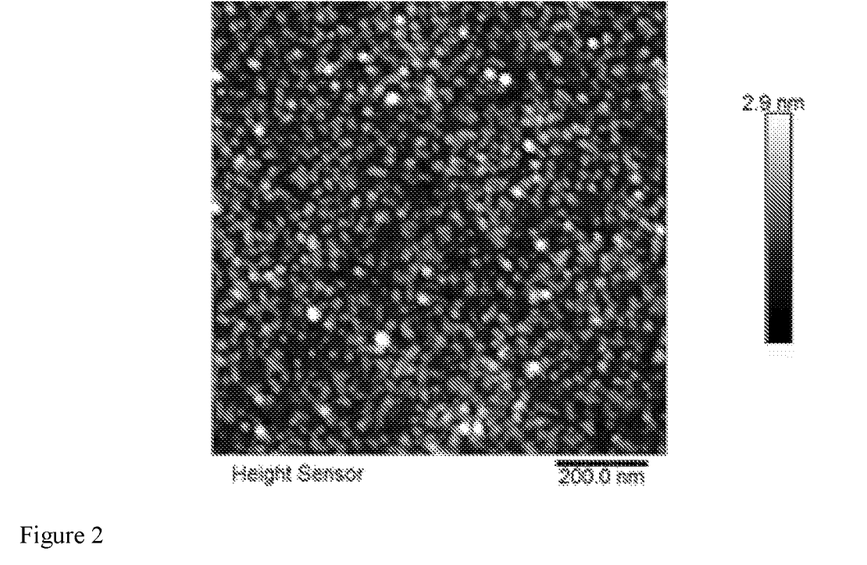
FIG. 2 is an atomic force microscope (AFM) image of the topmost surface of example 4 which comprises ZnSnZrOx with 29 atomic percent zirconium (at. % Zr).

As can be seen also from a comparison of FIGS. 1 and 2 in relation to examples 1 and 4 respectively, the topography of the topmost dielectric surface for example 4 for ZnSnZrOx with 29 atomic percent zirconium (at. % Zr) has a maximum height of 2.9 nm. In contrast, the topography of the topmost surface of example 1 with a ZnSnOx dielectric top layer has a maximum height of 4.5 nm, that is, an improvement in peak height when using a topmost dielectric of ZnSnZrOx of over 30%.

XPS analysis—X-ray photoelectron spectroscopy (XPS) depth profiling was carried out on Thermo K-Alpha XPS using an argon ion etch beam operating at 1 keV (M), producing a beam current of 1.71 μA, and rastered over a 2.0×4.0 mm area. A 15 second etch time per level was used with 100 levels of total etching. The X-ray spot size used was 400 μm.

The binding energy windows used in the acquisition of the profile were: O1s, C1s, Zn2p, Sn3d, Zr3d, Si2p, Ca2p, Na1s and Mg1s. A survey spectrum (which collects the entire 0-1350 eV binding energy range) was also collected to enable the detection of any additional elements present within the coating. As XPS is a quantitative technique, the concentration of each element within a coating layer may be determined and used to calculate a stoichiometry. For each coating, an average stoichiometry was calculated, based on the average concentration of each element in the layer. The first few etch levels were removed to reduce the influence of surface contamination.

Summary of Results

Comparative Example 1 comprises a stack with an uppermost layer of ZnSnOx, that is, a topmost dielectric layer devoid of zirconium. Comparative Example 1 exhibits good performances in terms of hazescan value and mechanical robustness tests.

Comparative Example 2 has an arrangement in which the uppermost dielectric layers of the stack comprise $ZnSnO_x$ and ZrOx. This change results in an increase in the hazescan value and a deterioration of the robustness in terms of the oil rub test.

Comparative Example 3 adds a $ZrO_x$ layer as the uppermost dielectric layer. The oil rub test results are improved compared to comparative example 2, and the hazescan value results are comparable with example 1.

Example 4 according to the present invention comprises a layer of ZnSnZrOx as the uppermost layer of the stack, with a zirconium content of 29 atomic percent (at. %). The hazescan value for example 4 is comparable to examples 1 and 3. Example 4 provides an improvement in terms of the scratch load and also the change in light transmittance after heat treatment. Example 4 also provides an improvement in terms of the change in transmission colour upon heat treatment (T ΔE*)

Example 5, also according to the present invention comprises a layer of ZnSnZrOx as the uppermost layer of the stack, with a Zirconium content of 21 atomic percent (at. %). The hazescan value for example 5 is comparable to that for example 4 as well as examples 1 and 3. Example 5 also demonstrates an improvement in terms of the scratch load over comparative examples 1, 2 and 3 as well as the change in light transmittance after heat treatment. Example 5 also provides an improvement in terms of the change in film side reflection colour upon heat treatment (T ΔE*).

In Table 2 there is provided the results for a series of coated glass panes comprising two layers of silver. Examples, 6, 7 and 8 are comparative examples comprising an uppermost layer of ZnSnOx, ZrOx, or ZnSnOx and ZrOx respectively.

For example 9 according to the present invention, it can be seen that for a coating with two silver-based functional layers which also comprises a layer of ZnSnZrOx as the uppermost layer of the stack, with a zirconium content of 29 atomic percent (at. %), the example provides an improved sheet resistance after heat treatment and an improved oil rub test score. Example 9 also provides an improvement in terms of the change in film side reflection colour upon heat treatment (T $\Delta E^*$) as with example 4.

In Table 3 there is again provided results for a series of coated glass panes comprising two silver-based functional layers but in which the tungsten nitride layer (WNx) in the upper dielectric layer in examples 6, 7, 8 and 9 have been replaced by a layer of ZAO. In comparative Examples, 10, 11 and 12, the uppermost layer comprises ZnSnOx, ZrOx, or ZnSnOx and ZrOx respectively.

For examples 13 and 14 according to the present invention it can be seen that for the coated glass panes comprising two silver-based functional layers with a layer of ZnSnZrOx as the uppermost layer, there is an improvement in the scratch load, and the change in light transmission value after heat treatment compared to examples 11 and 12. The sheet resistance after heat treatment is also improved for examples 13 and 14 compared with examples 10, 11 and 12.

Therefore it can be seen from the above results that the coated glass panes of the present invention provide good heat treatability and mechanical durability, with an uppermost dielectric layer based on an oxide of zinc (Zn), tin (Sn) and zirconium (Zr); and wherein the amount of zirconium in the layer comprises at least 10 atomic percent zirconium.

The coated glass panes exhibit good hazescan values before and after heat treatment, which indicates that the stack combinations are not compromised by heat treatment. The panes of the present invention also show a low level of visible damage according to the tests simulating use, processing and handling conditions for coated glass panes. Furthermore the panes exhibit high light transmittance and low emissivity and/or good solar control properties, with optical properties remaining stable even after heat treatment.

The invention claimed is:

1. A coated glass pane comprising at least the following layers in sequence:
    a glass substrate;
    a lower anti-reflection layer;
    a silver-based functional layer;
    a barrier layer;
    an upper dielectric layer; and
    a topmost dielectric layer which comprises an oxide of zinc (Zn), tin (Sn) and zirconium (Zr); and wherein the amount of zirconium in the topmost dielectric layer comprises at least 10 atomic percent zirconium.

2. The coated glass pane according to claim 1, wherein the topmost dielectric layer based on an oxide of zinc (Zn) and tin (Sn) and zirconium (Zr) comprises at most 35 atomic % zirconium.

3. The coated glass pane according to claim 1, wherein the barrier layer is in direct contact with the silver-based functional layer.

4. The coated glass pane according to claim 1, wherein the lower anti-reflection layer comprises in sequence from the glass substrate either;
    a layer based on an oxide of zinc (Zn) and tin (Sn) and/or an oxide of tin (Sn);
    a separation layer; and
    a top layer based on an oxide of zinc (Zn),
    or,
    a layer based on an oxide of zinc (Zn) and tin (Sn) and/or an oxide of tin (Sn); and
    a top layer based on an oxide of zinc (Zn).

5. The coated glass pane according to claim 4, wherein the separation layer comprises:
    a metal oxide; and/or
    an (oxi)nitride of silicon and/or an (oxi)nitride of aluminium and/or alloys thereof.

6. The coated glass pane according to claim 4, wherein the lower anti-reflection layer further comprises:
    a base layer based on an (oxi)nitride of silicon and/or an (oxi)nitride of aluminium and/or alloys thereof, located between the glass substrate and the layer based on an oxide of zinc (Zn) and tin (Sn) and/or an oxide of tin (Sn).

7. The coated glass pane according to claim 6, wherein the base layer based on an (oxi)nitride of silicon and/or an (oxi)nitride of aluminium and/or alloys thereof has a thickness of from 20 to 40 nm.

8. The coated glass pane according to claim 4, wherein the layer based on an oxide of zinc (Zn) and tin (Sn) and/or an oxide of tin (Sn) of the lower anti-reflection layer has a thickness of from 0.5 to 10 nm.

9. The coated glass pane according to claim 6, wherein the layer based on an oxide of zinc (Zn) and tin (Sn) and/or an oxide of tin (Sn) of the lower anti-reflection layer is located directly on the base layer based on an (oxi)nitride of silicon and/or an (oxi)nitride of aluminium.

10. The coated glass pane according to claim 5, wherein the separation layer based on a metal oxide and/or an (oxi)nitride of silicon and/or an (oxi)nitride of aluminium and/or alloys thereof has a thickness of from 0.5 to 5 nm, and, wherein when the separation layer is based on a metal oxide, said metal oxide separation layer is selected from the group consisting of: Ti, Zn, NiCr, InSn, Zr, Al and/or Si.

11. The coated glass pane according to claim 5, wherein the separation layer further includes one or more other chemical elements chosen from at least one of the following elements: Ti, V, Mn, Co, Cu, Zn, Zr, Hf, Al, Nb, Ni, Cr, Mo, Ta, Si, or from an alloy based on at least one of these materials.

12. The coated glass pane according to claim 4, wherein the top layer of the lower anti-reflection layer, based on an oxide of zinc (Zn), comprises a thickness of from 4 to 10 nm.

13. The coated glass pane according to claim 1, wherein the silver-based functional layer has a thickness of from 5 to 20 nm.

14. The coated glass pane according to claim 4, wherein the top layer based on an oxide of Zn in the lower anti-reflection layer is in direct contact with the silver-based functional layer.

15. The coated glass pane according to claim 1, wherein the barrier layer has a thickness of from 1 to 10 nm, and wherein, the barrier layer comprises a layer based on an oxide of zinc (Zn) or, the barrier layer comprises NiCrOx.

16. The coated glass pane according to claim 1, wherein the upper dielectric layer comprises:
    i) a layer based on an oxide of zinc (Zn) and tin (Sn) and/or an oxide of tin (Sn);
    ii) a layer based on an oxide of zinc (Zn); and
    iii) a layer based on an (oxi)nitride of silicon and/or an (oxi)nitride of aluminium.

17. The coated glass pane according to claim 16, wherein the thickness of the layer based on an oxide of zinc (Zn) and (Sn) and/or an oxide of tin (Sn) in the upper dielectric layer is in the range 1 to 10 nm and, wherein the thickness of the layer based on an oxide of zinc (Zn) in the upper dielectric layer is in the range 1 to 10 nm, and, wherein the thickness of the layer based on an (oxi)nitride of silicon and/or an (oxi)nitride of aluminium in the upper dielectric layer is in the range 20 to 40 nm.

18. The coated glass pane according to claim 1, wherein the topmost dielectric layer based on an oxide of zinc (Zn) and tin (Sn) comprises 15 to 35 atomic % zirconium.

19. The coated glass pane according to claim 1, wherein the pane comprises more than one silver-based functional layer, and, wherein each silver-based functional layer is spaced apart from an adjacent silver-based functional layer by an intervening central anti-reflection layer.

20. The coated glass pane according to claim 4, wherein when the separation layer in the lower anti-reflection layer is based on a metal oxide, said metal oxide comprises an oxide of zinc (Zn) and/or an oxide of titanium (Ti).

21. A method of manufacturing a coated glass pane in accordance with claim 1, comprising:
 i) providing a glass substrate;
 ii) providing a lower anti-reflection layer;
 iii) providing a silver-based functional layer;
 iv) providing a barrier layer; and
 v) providing an upper dielectric layer; and
 vi) providing a topmost dielectric layer which comprises an oxide of zinc (Zn), tin (Sn) and zirconium (Zr); and wherein the amount of zirconium in the topmost dielectric layer comprises at least 10 atomic percent zirconium; and wherein any portion of the barrier layer that is in direct contact with the silver-based functional layer is deposited by sputtering in an atmosphere with less than 5 volume percent oxygen.

22. A multiple glazing unit incorporating a coated glass pane in accordance with claim 1.

\* \* \* \* \*